(12) United States Patent
Alsharif et al.

(10) Patent No.: US 11,477,228 B2
(45) Date of Patent: Oct. 18, 2022

(54) METHOD AND SYSTEM FOR BLOCKCHAIN ACCREDITATION MECHANISM BASED ON CYBERSECURITY RISK

(71) Applicant: SAUDI ARABIAN OIL COMPANY, Dhahran (SA)

(72) Inventors: Sultan Saadaldean Alsharif, Dhahran (SA); Wael Mohammed Alagi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 351 days.

(21) Appl. No.: 16/734,005

(22) Filed: Jan. 3, 2020

(65) Prior Publication Data
US 2021/0211451 A1 Jul. 8, 2021

(51) Int. Cl.
H04L 29/06 (2006.01)
H04L 9/40 (2022.01)
G06F 16/23 (2019.01)

(52) U.S. Cl.
CPC ...... H04L 63/1433 (2013.01); G06F 16/2365 (2019.01)

(58) Field of Classification Search
CPC ............. H04L 63/1433; H04L 2209/38; H04L 2209/805; H04L 2209/88; H04L 9/3239; H04L 63/12; G06F 16/2365; H04W 4/38; H04W 4/70
See application file for complete search history.

(56) References Cited

U.S. PATENT DOCUMENTS 10,839,395 B2 * 11/2020 Simons ................ H04L 9/3236
11,321,718 B1 * 5/2022 Narendranathan ......................... G06Q 20/4016
2009/0254993 A1 * 10/2009 Leone ................ H04L 63/1433
    455/418
2017/0013014 A1 * 1/2017 Foster .................... H04L 67/02
2017/0063910 A1 * 3/2017 Muddu .................. H04L 43/08
(Continued)

FOREIGN PATENT DOCUMENTS

CN      108848184 A     11/2018
CN      109639837 A      4/2019
(Continued)

OTHER PUBLICATIONS

International Search Report and Written Opinion in corresponding International Application No. PCT/US2020/016361, dated Sep. 25, 2020 (13 pages).
Besfort Shala et al: "Novel trust consensus protocol and blockchain-based trust evaluation system for M2M application services", Internet of Things, Jan. 1, 2019 (Jan. 1, 2019), p. 58, XP055731489, DOI: 10.1016/j.iot.2019.10, URL: https://www.sciencedirect.com/science/article/pii/S2542660519301234 (25 pages).
(Continued)

*Primary Examiner* — Mahfuzur Rahman
(74) *Attorney, Agent, or Firm* — Osha Bergman Watanabe & Burton LLP

(57) ABSTRACT

A method may include obtaining various votes for a blockchain transaction from various blockchain nodes. The method may further include determining various weighted votes using the votes and respective cybersecurity states of the blockchain nodes. The respective cybersecurity states may correspond to whether a predetermined security vulnerability is associated with the blockchain nodes. The respective cybersecurity states may be dynamic values that are updated based on changes among predetermined security vulnerabilities. The method may further include determining whether to validate the blockchain transaction based on the weighted votes.

17 Claims, 7 Drawing Sheets

(56) References Cited

U.S. PATENT DOCUMENTS

| | | | |
|---|---|---|---|
| 2017/0214701 A1* | 7/2017 | Hasan | H04L 63/145 |
| 2018/0101560 A1 | 4/2018 | Christidis et al. | |
| 2018/0219669 A1 | 8/2018 | Chen et al. | |
| 2018/0255079 A1* | 9/2018 | Paine | H04L 63/1466 |
| 2019/0095879 A1 | 3/2019 | Eyal et al. | |
| 2019/0213652 A1 | 7/2019 | Sharma et al. | |
| 2019/0230089 A1 | 7/2019 | Xu et al. | |
| 2019/0260785 A1* | 8/2019 | Jenkinson | G06N 20/20 |
| 2019/0279215 A1 | 9/2019 | Kuchar et al. | |
| 2020/0043007 A1* | 2/2020 | Simons | G06Q 20/308 |
| 2020/0311816 A1* | 10/2020 | Calvin | G06Q 20/065 |
| 2021/0112087 A1* | 4/2021 | Tassoumt | G06Q 30/0215 |
| 2022/0084055 A1* | 3/2022 | Frank | G06F 21/6245 |

FOREIGN PATENT DOCUMENTS

| | | |
|---|---|---|
| CN | 110034959 A | 7/2019 |
| CN | 110197373 A | 9/2019 |
| CN | 110474868 A | 11/2019 |
| EP | 3437353 A1 | 2/2019 |
| WO | 2019112714 A1 | 6/2019 |

OTHER PUBLICATIONS

Md Swawibe Ul Alam Ul Alam: "Runtime Self-Protection in a Trusted Blockchain-inspired Ledger", Oct. 3, 2017 (Oct. 3, 2017), XP055611591, URL: https://www.researchgate.net/profile/Md_Swawibe_Ul_Alam/publication/326243461_Runtime_Self-Protection_in_a_Trusted_Blockchain-inspired_Ledger/links/5bfa1f7f299bf1a0203140ba/Runtime-Self-Protection-in-a-Trusted-Blockchain-inspired-Ledger.pdf (11 pages).

Stefanos Leonardos et al: "Weighted Votiing on the Blockchain: Improving Consensus in Proof of Stake Protocols", ARXIV.org, Cornell University Library, 201 Olin Library Cornell University Ithaca, NY 14853, Mar. 11, 2019 (Mar. 11, 2019), XP081131848 (9 pages).

Examination Report issued in corresponding GCC Application No. GC 2020-39307, dated Oct. 27, 2021 (5 pages).

Yaga, Dylan J., et al. "Blockchain Technology Overview" NIST, Nov. 10, 2018 (68 pages).

White Paper—EtherZero (Smart Contract Platform & Decentralized Applications Blockchain, MPoS) dated Jan. 13, 2019 (36 pages).

* cited by examiner

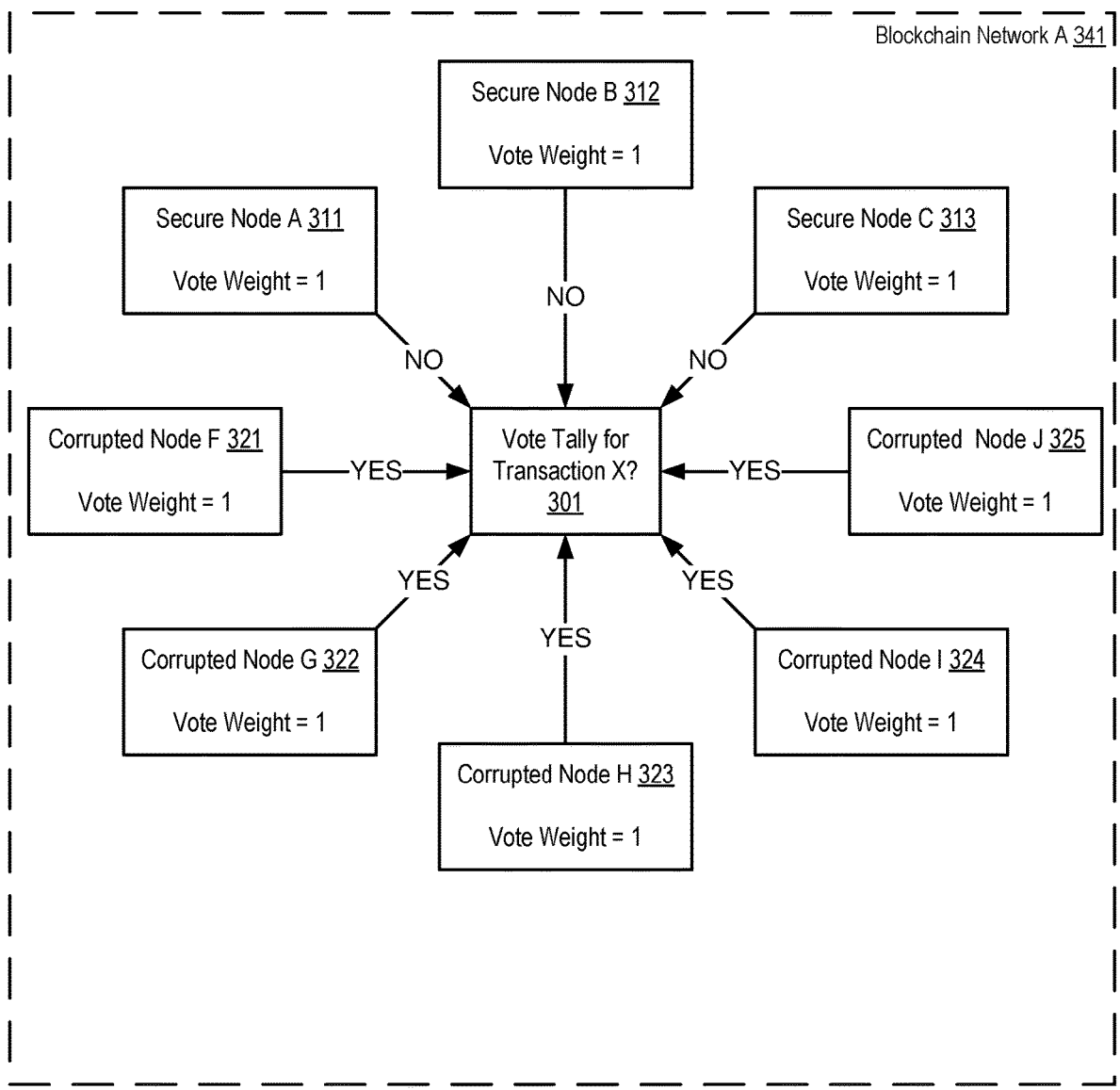
FIG. 3.1

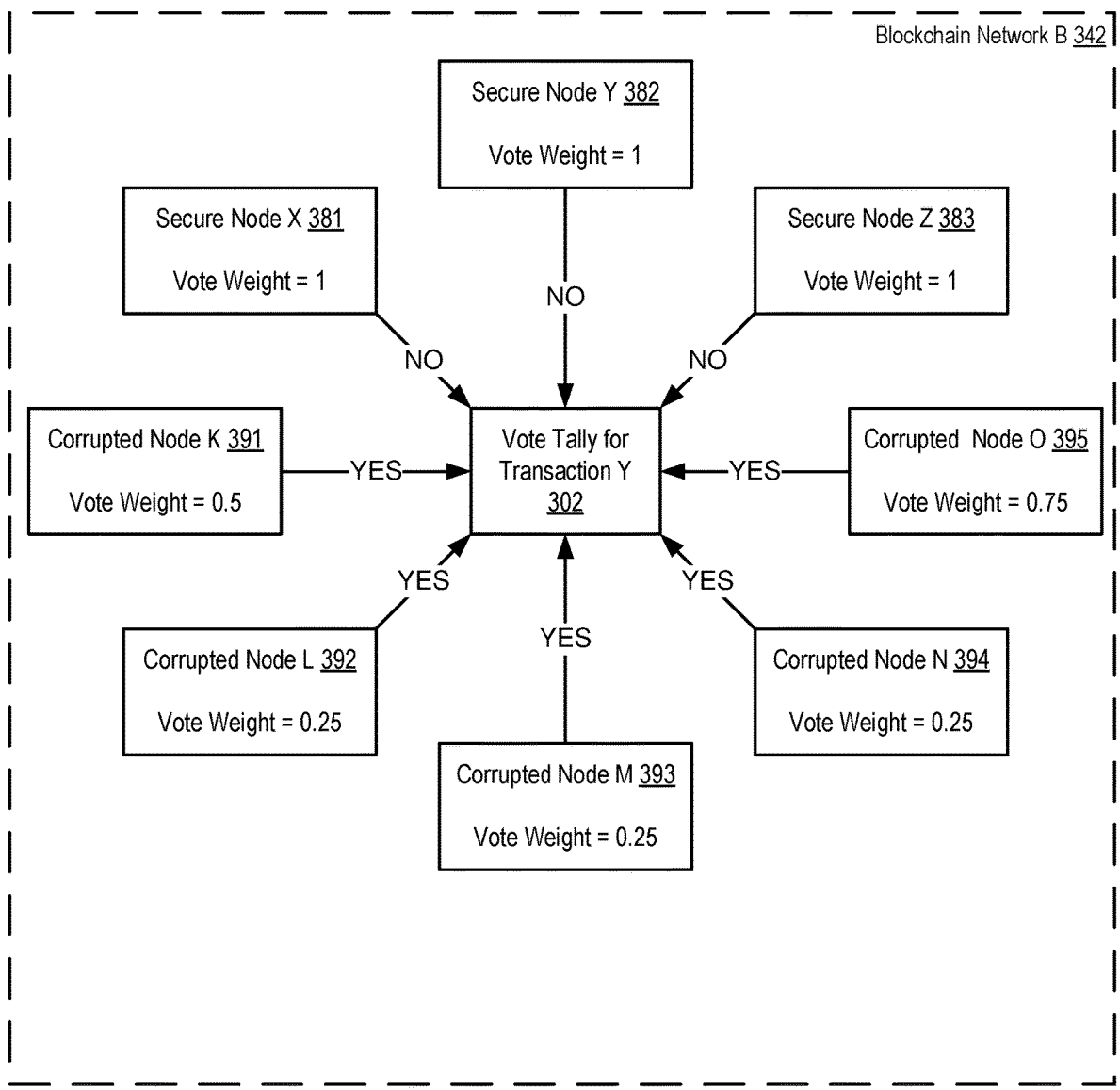
FIG. 3.2

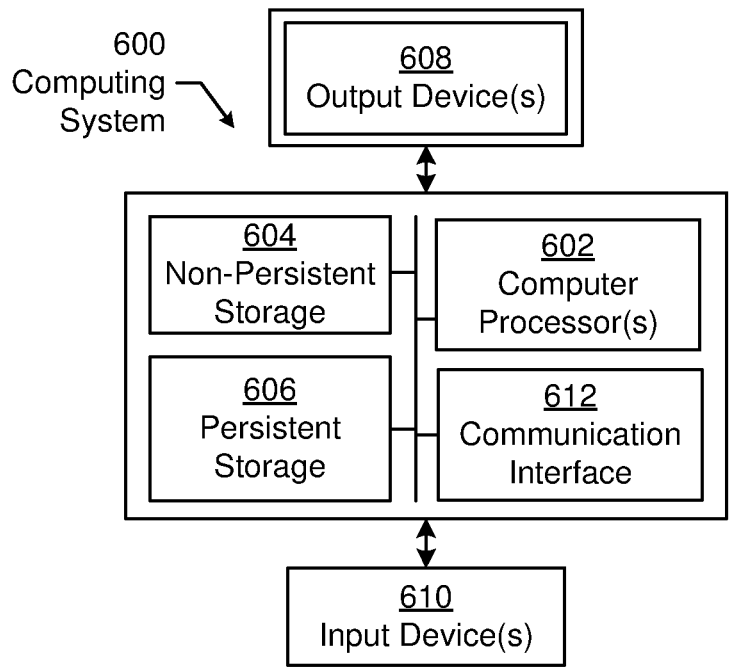
FIG. 6.1
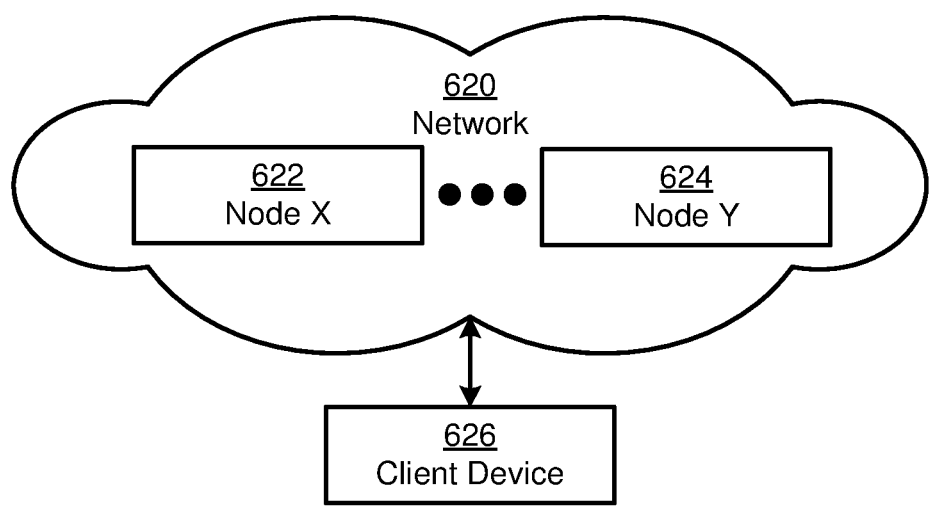
FIG. 6.2

METHOD AND SYSTEM FOR BLOCKCHAIN ACCREDITATION MECHANISM BASED ON CYBERSECURITY RISK

BACKGROUND

Blockchain networks may provide a decentralized approach for recording transactions between two or more parties efficiently and in a verifiable and permanent way. These records, also called blocks, are typically managed by a peer-to-peer blockchain network that follows a protocol for inter-node communication and validating new records. However, as with any network, nodes in a blockchain network may be compromised by malicious agents. Accordingly, technologies are desired that can provide secure validation of blockchain records and transactions.

SUMMARY

In general, in one aspect, embodiments relate to a method that includes obtaining various votes for a blockchain transaction from various blockchain nodes. The method includes determining various weighted votes using the votes and respective cybersecurity states of the blockchain nodes. The respective cybersecurity states correspond to whether a predetermined security vulnerability is associated with the blockchain nodes. The respective cybersecurity states are dynamic values that are updated based on changes among predetermined security vulnerabilities. The method includes determining whether to validate the blockchain transaction based on the weighted votes.

In general, in one aspect, embodiments relate to a node that includes a computer processor and a memory coupled to the computer processor and executable by the computer processor. The memory includes functionality for obtaining various votes for a blockchain transaction from various blockchain nodes. The memory includes functionality for determining various weighted votes using the votes and respective cybersecurity states of the blockchain nodes. The respective cybersecurity states correspond to whether a predetermined security vulnerability is associated with the blockchain nodes. The respective cybersecurity states are dynamic values that are updated based on changes among predetermined security vulnerabilities. The memory includes functionality for determining whether to validate the blockchain transaction based on the weighted votes.

In general, in one aspect, embodiments relate to a system that includes a first blockchain node, a second blockchain node, and a master node coupled over a network to the first blockchain node and the second blockchain node. The master node obtains vulnerability data regarding a first scan of the first blockchain node and a second scan of the second blockchain node. The cybersecurity vulnerability data describes whether a predetermined security vulnerability is associated with the first blockchain node and the second blockchain node. The master node determines, using the vulnerability data, weighted voting criteria for validating blockchain transactions. The master node transmits, to the first blockchain node and the second blockchain node, the weighed voting criteria.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 3.1 and 3.2 show examples in accordance with one or more embodiments.

FIGS. 6.1 and 6.2 show a computing system in accordance with one or more embodiments.

DETAILED DESCRIPTION

Figure 1:
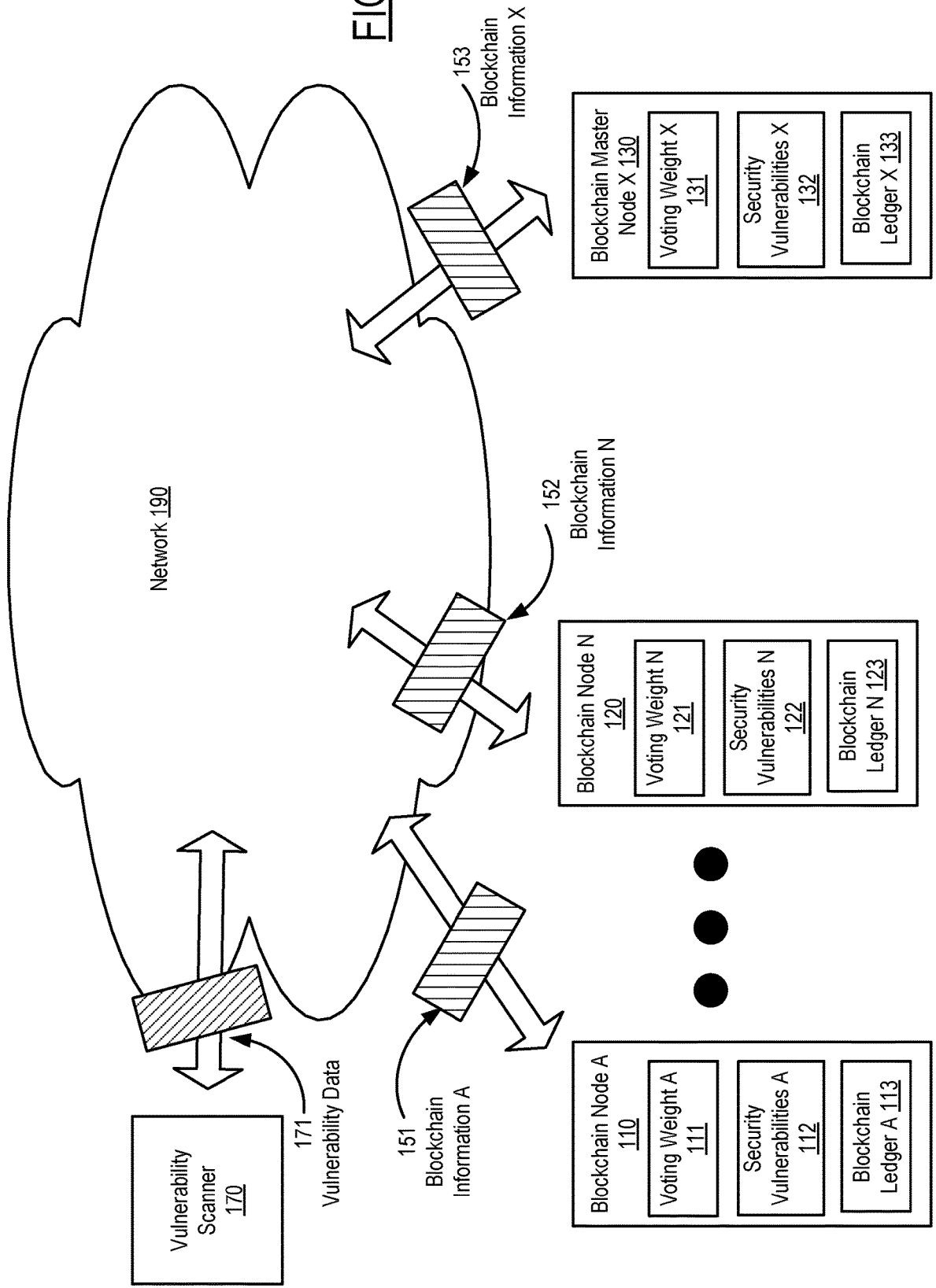
FIG. 1 shows a block diagram of a system in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for weighting votes within a blockchain network based on cybersecurity states of computing devices that form the network. More specifically, some embodiments are directed toward a blockchain network that implements a trust input based on individual cybersecurity states. This trust input may be used accordingly in blockchain consensus validations of blockchain transactions. In particular, a blockchain network may include various interconnected computing devices, i.e., blockchain nodes, that provide a voting tally for validating blockchain transactions. For example, whenever a blockchain transaction is performed, different blockchain nodes vote to determine whether the respective transaction is valid or should be refused. Typically, votes within the blockchain network are given equal weight, i.e., each node in the blockchain network may have one equal vote with the network's other nodes.

However, similar to many computing devices, blockchain nodes may be susceptible to cyber-attacks by malicious agents. As such, different computing devices may also have different chances of being compromised by these malicious agents. Rather than relying solely on the node vote to verify the validity of the transaction, a cybersecurity trust level of the respective node is taken into consideration for reaching the voting consensus. For example, one blockchain node may be operating on a computing device, where the node's operating system and antivirus software application lack recent software updates. On the other hand, a different blockchain node may have installed the most current updates for its operating system and antivirus software application. Thus, these two blockchain nodes may have different cybersecurity states based on different levels of security vulnerability. Accordingly, different voting weights may be assigned these different blockchain nodes to account for their different cybersecurity risks.

Turning to FIG. 1, FIG. 1 shows a block diagram of a system in accordance with one or more embodiments. As shown in FIG. 1, various blockchain nodes (e.g., blockchain node A (110), blockchain node N (120), blockchain master node X (130)) may communicate over a network (e.g., network (190)). Specifically, a blockchain node may be a computing device that includes hardware and/or software with functionality for generating blockchain records and/or validating blockchain transactions. Blockchain nodes may be similar to computing system (600) described below in FIGS. 6.1 and 6.2 and the accompanying descriptions.

Furthermore, a blockchain node may include functionality for broadcasting blockchain information (e.g., blockchain information A (151), blockchain information N (152), blockchain information X (153)) to other nodes within a blockchain network. For example, blockchain information may describe a request to perform a new blockchain transaction. As another example, blockchain information may include voting information regarding one or more pending transactions waiting for validation. Likewise, blockchain information may also include network information such as destination addresses for communicating with other blockchain nodes in the blockchain network.

Keeping with FIG. 1, a blockchain node may include functionality for recording a transaction within a ledger (e.g., blockchain ledger A (113), blockchain ledger N (123), and blockchain ledger X (133)). For example, a blockchain protocol may use a distributed digital ledger of cryptographically signed transactions that are grouped as blockchain records. A new blockchain record may be cryptographically linked to the previous record after the necord's validation. As new records are added, previous blockchain records may become more difficult to modify by malicious agents. This feature of blockchain protocols may produce tamper resistance within a blockchain history. Accordingly, new records may be replicated across copies of the ledger within the network, and any conflicts may be resolved automatically using established rules. A ledger may be stored in each node within a blockchain network.

In some embodiments, blockchain nodes have different voting weights based on weighted voting criteria (e.g., voting weight A (111) for blockchain node A (110), voting weight N (121) for blockchain node N (120), and voting weight X (131) for blockchain master node X (130)). Specifically, the weighted voting criteria may be based on respective cybersecurity states of individual blockchain nodes. For example, different blockchain nodes within a blockchain network may include different security vulnerabilities (e.g., security vulnerabilities A (112), security vulnerabilities N (122), security vulnerabilities X (132)) and thus different cybersecurity risks may be associated with each blockchain node. Depending on the amount of vulnerabilities and/or type of vulnerabilities, a particular node may have a greater trust level within the blockchain network. Thus, a vote by a node with a greater trust level may receive more weight in a vote tally for validating or rejecting a blockchain transaction.

Furthermore, a blockchain network may include one or more master nodes (e.g., blockchain master node X (130)). In particular, a master node may include hardware and/or software that manages administration of a blockchain network. For example, master nodes may vote in governance events of a blockchain network, where non-master nodes cannot vote on the governance events. In another example, master nodes may include functionality for verifying whether a blockchain transaction can be performed, e.g., by reviewing account balances of parties to the transaction, reviewing a signature of the transaction, etc. Likewise, after a transaction is validated with a vote tally, a master node may transmit a confirmation message over a blockchain network that the transaction was accepted (i.e., was validated) or rejected (i.e., was not validated). Upon receipt of a confirmation message, blockchain nodes may update their respective ledger accordingly. Moreover, a master node may always be online in a blockchain network in order to allow for instant transactions by validating in realtime.

In some embodiments, a master node include functionality for determining weighted voting criteria for respective blockchain nodes. For example, a master node may implement rules and/or thresholds within a blockchain network for scoring cybersecurity states and determining voting weights. In some embodiments, a master node may collect vulnerability data regarding each blockchain node in a blockchain network in order to determine the weighted voting criteria. A master node may add such weighted voting criteria into the blockchain ledger for distribution to other blockchain nodes.

In some embodiments, a vulnerability scanner (e.g., vulnerability scanner (170)) is coupled to a blockchain network. For example, a vulnerability scanner may include hardware and/or software to analyze blockchain nodes in a blockchain network for security vulnerabilities. In some embodiments, for example, a vulnerability scanner may generate vulnerability data (e.g., vulnerability data (171)) based on a vulnerability scan performed on a blockchain node. Vulnerability data may describe which security vulnerabilities are located in one or more blockchain nodes. Likewise, vulnerability data may be broadcast over a blockchain network by a vulnerability scanner and/or individual blockchain nodes, such as to determine voting weights. While the vulnerability scanner (170) is shown separate from blockchain nodes in FIG. 1, in one or more embodiments, a vulnerability scanner may be located on one or more master nodes and/or other blockchain nodes.

While FIG. 1 shows various configurations of components, other configurations may be used without departing from the scope of the disclosure. For example, various components in FIG. 1 may be combined to create a single component. As another example, the functionality performed by a single component may be performed by two or more components.

Figure 2:
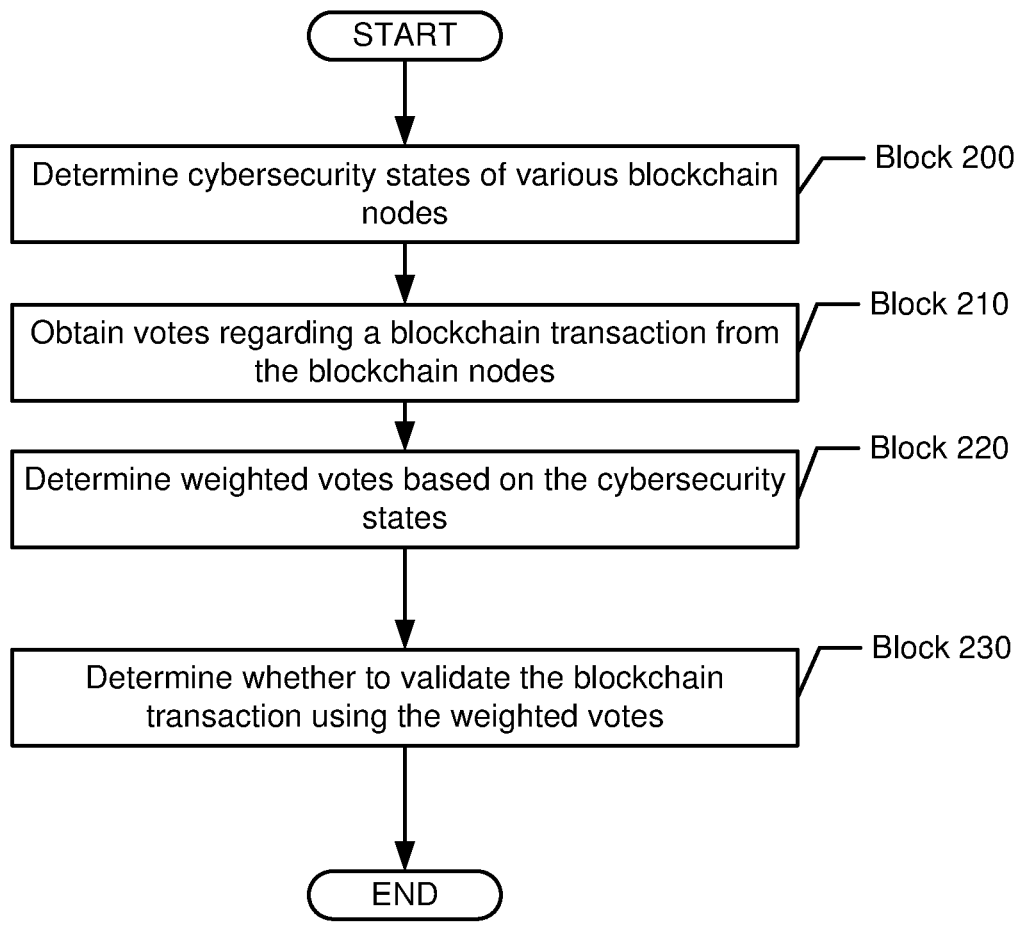
FIG. 2 shows a flowchart in accordance with one or more embodiments.

Turning to FIG. 2, FIG. 2 shows a flowchart in accordance with one or more embodiments. Specifically, FIG. 2 describes a general method for validating a blockchain transaction based on cybersecurity states. One or more blocks in FIG. 2 may be performed by one or more components (e.g., blockchain master node X (130)) as described in FIG. 1. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 200, various cybersecurity states are determined regarding various blockchain nodes in accordance with one or more embodiments. For example, the cybersecurity state of a respective blockchain node may be a dynamic value that changes over time as the cybersecurity trust level of the node also changes. For example, a computing device operating a blockchain node may or may not be properly maintained. While a respective computing device may have few security vulnerabilities relative to the rest of the computing devices forming a blockchain network, failure to update the respective computing device may result in an increasing number of security vulnerabilities over time. In contrast, other computing devices that are properly updated may have the risk of their cybersecurity states decrease over time.

Accordingly, the probability that a malicious entity may corrupt a node using a security vulnerability may also change over time. Thus, vulnerability data may be obtained periodically regarding nodes within a blockchain network to determine the current cybersecurity state and whether any cybersecurity states have changed within the blockchain network. For example, if a new blockchain node is added to the network, the new blockchain node may need to undergo an evaluation to determine its cybersecurity state with respect to other nodes in the network.

In some embodiments, a vulnerability scanner may determine cybersecurity states of various blockchain nodes. For example, the vulnerability scanner may analyze which versions of operating systems and other software applications are running on a particular blockchain node. Likewise, a vulnerability scanner may analyze various update histories of a blockchain node, e.g., with respect to virus definition updates for an antivirus software program, patches for addressing security issues, etc. Likewise, third party applications may have known security vulnerabilities and thus the vulnerability scanner may obtain information from external data sources regarding cybersecurity risks associated with any third party applications. In some embodiments, multiple techniques may be used to determine a cybersecurity state such as vulnerability scanning tools, source code scanning tools, analysis of security configurations, and/or compliance tools.

In Block 210, various votes are obtained from various blockchain nodes regarding a blockchain transaction in accordance with one or more embodiments. Within a blockchain network, various types of transactions may be validated in a distributed fashion (i.e., without a central repository) using blockchain technology. For example, a transaction may be validated without obtaining authorization by a central authority (i.e., a bank, company, or government). Blockchain nodes may thus vote in order to verify the validity of transactions between multiple parties where the parties are not easily identified. Prior to the use of blockchain technology, such trusted transactions may have been performed using trusted intermediaries agreed upon by the parties.

In Block 220, various weighted votes are determined based on various cybersecurity states in accordance with one or more embodiments. For example, a blockchain node's contribution to a voting tally may be determined by voting weight based on cybersecurity states. For illustration purposes, a node with a cybersecurity state with little risk may have its weighted vote be worth twice the weighted vote of a node with dangerous level of risk associated with its cybersecurity state.

In particular, by weighting votes based on cybersecurity states, a compromised node's vote may be mitigated by votes of nodes with higher cybersecurity trust levels. Accordingly, one or more master nodes may determine weighted voting criteria for adjusting individual votes into weighted votes. For example, the weighted voting criteria may categorize different cybersecurity states with different voting weights, as shown in Table 1 below:

TABLE 1

Severity and resulted trust level factor

| Vulnerability Severity of Cybersecurity State | Voting Weight |
|---|---|
| Critical | 0.25 |
| High | 0.5 |
| Medium | 0.75 |
| Low | 0.9 |

With reference to Table 1 above, blockchain nodes may be divided among various cybersecurity thresholds. For example, thresholds may correspond to cybersecurity risk levels being critical, high, medium, and low, where these thresholds may be assigned based on number of security vulnerabilities. Likewise, certain types of security vulnerabilities may be associated with certain cybersecurity thresholds. For example, if an operating system running a blockchain node is out-of-date, then the blockchain node may automatically satisfy a cybersecurity threshold of being "critical" or "high."

In some embodiments, voting weights for a particular blockchain node may be updated overtime. For example, a blockchain node may undergo periodic vulnerability scans in order to determine whether a change has occurred in the node's cybersecurity state. If a change has occurred, the voting weight of the node as well as other weighted voting criteria may be updated accordingly.

In some embodiments, past cybersecurity states are considered in determining weighted voting criteria. For example, if a node maintains a score with a low cybersecurity risk over a period of time, this node may have its voting weight increase with respect to other nodes that either recently obtained a score of a low cybersecurity risk. Moreover, votes of blockchain nodes that regularly change between different cybersecurity thresholds may be weighted less than consistent nodes.

In Block 230, a determination is made whether to validate a blockchain transaction using various weighted votes in accordance with one or more embodiments. Depending on the blockchain protocol implemented on a blockchain network, one or more master nodes may aggregate the weighted votes to confirm whether a blockchain transaction is validated accordingly. Likewise, where the blockchain network has no master nodes, each node in a blockchain network may validate the transaction using the weighted votes.

Turning to FIGS. 3.1 and 3.2, FIGS. 3.1 and 3.2 provide examples of blockchain transaction validations. The following examples are for explanatory purposes only and not intended to limit the scope of the disclosed technology.

In FIG. 3.1, a blockchain network A (341) is shown that includes various blockchain nodes (i.e., secure node A (311), secure node B (312), secure node C (313), corrupted node F (321), corrupted node G (322), corrupted node H (323), corrupted node I (324), and corrupted node J (325)). Here, various nodes (321, 322, 323, 324, 325) have been corrupted by a malicious party in order to authorize improper blockchain transactions. In contrast, several nodes (311, 312, 313) are still secure and have not been comprised by the malicious party. As such, the malicious party submits a request (361) to perform a transaction X that would be improper. An example of an improper transaction may include an attempt at transferring blockchain funds already committed to a different party by a previous transaction that is still pending. Likewise, the malicious party may also use control of the corrupted nodes to reject proper transactions as well.

Keeping with FIG. 3.1, votes in the blockchain network A (341) are not weighted, and thus the corrupted nodes (321, 322, 323, 324, 325) receive equal consideration in the vote tally (301) for transaction X. Thus, as shown in FIG. 3.1, the corrupted nodes (391, 321, 322, 323, 324, 325) outvote the secure nodes (311, 312, 313), and the malicious party is able to validate transaction X.

Turning to FIG. 3.2, a blockchain network B (342) is shown that includes various blockchain nodes (i.e., secure node X (381), secure node Y (382), secure node Z (383), corrupted node K (391), corrupted node L (392), corrupted node M (393), corrupted node N (394), and corrupted node O (395)). Similar to FIG. 3.1, various nodes (391, 392, 393, 394, 395) have been corrupted by a malicious party in order to authorize improper blockchain transactions. In contrast, several nodes (381, 382, 383) are still secure and have not been comprised by the malicious party.

As shown in FIG. 3.2, the malicious party submits a request (362) to perform a transaction Y that would be improper. However, the blockchain network B (342) implements vote weighting based on cybersecurity states. Specifically, based on weighted voting criteria, the secure nodes (381, 382, 382) have cybersecurity states that garner vote weights equal to '1'. In contrast, corrupted node K (391) has a vote weight of '0.5', corrupted node L (392) has a vote weight of '0.25', corrupted node M (393) has a vote weight of '0.25', corrupted node N (394) has a vote weight of '0.25', and corrupted node O (395) has a vote weight of '0.75'. Accordingly, while the corrupted nodes (391, 392, 393, 394, 395) are able to outvote the secure nodes (381, 382, 383), the voting weight of the corrupted nodes (391, 392, 393, 394, 395) is less than the voting weight of the secure nodes (381, 382, 383). Thus, even with a majority of nodes voting for transaction Y, transaction Y is rejected by a minority of nodes with better cybersecurity states according to the weighted voting criteria. Therefore, the malicious party's request (362) to perform a transaction Y is rejected by blockchain network B (342).

Figure 4:
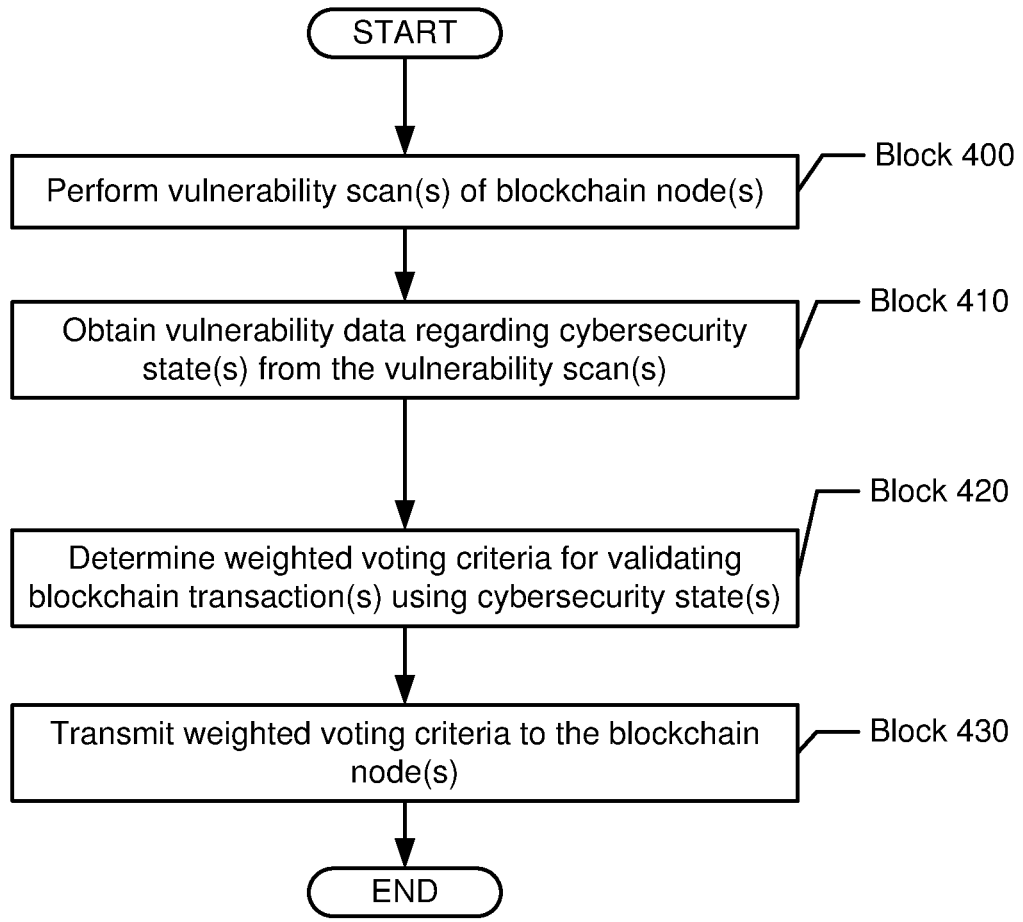
FIG. 4 shows a flowchart in accordance with one or more embodiments.

Turning to FIG. 4, FIG. 4 shows a flowchart in accordance with one or more embodiments. Specifically, FIG. 4 describes a general method for managing cybersecurity weights for a blockchain network. One or more blocks in FIG. 4 may be performed by one or more components (e.g., blockchain master node X (130)) as described in FIG. 1. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, one or more vulnerability scans are performed on one or more blockchain nodes in accordance with one or more embodiments. In particular, vulnerability data may be collected regarding individual blockchain nodes in order to determine weighted voting criteria and/or voting weights of respective blockchain nodes. Where a blockchain node may perform its own internal scan of security vulnerabilities associated with its computing device, nodes may be scanned by outside entities, e.g., an external vulnerability scanner or other nodes. For example, a master node may transmit information requests to a different blockchain node to identify operating system information, antivirus software information, third party application information, etc. Using this information, a master node may communicate with external data sources, e.g., over the Internet, to identify whether the blockchain node's operating system and/or antivirus software is current or missing updates.

In Block 410, vulnerability data is obtained regarding one or more cybersecurity states from one or more vulnerability scans in accordance with one or more embodiments. After one or more security vulnerabilities are identified for a respective blockchain node, the one or more security vulnerabilities may be analyzed to determine a type of cybersecurity state for the respective blockchain node. For example, the vulnerability data may identify the cybersecurity state as being a 'critical', 'high', 'medium', or 'low' security risk. The vulnerability data in Block 410 may be similar to the vulnerability data (171) described in FIG. 1 and the accompanying description.

In Block 420, weighted voting criteria is determined for validating one or more blockchain transactions using vulnerability data in accordance with one or more embodiments. For example, one or more master nodes may determine the weighted voting criteria for a particular blockchain network. Thus, the weighted voting criteria may be determined such that the voting weights among nodes achieves a particular degree of protection that an improper transaction is not validated. For example, the weighted voting criteria may include the voting weights for each node in the blockchain network. Likewise, the weighted voting criteria may describes rules and/or thresholds for calculating voting weights using vulnerability data for respective nodes.

In Block 430, weighted voting criteria is transmitted to one or more blockchain nodes in accordance with one or more embodiments. After determining the weighted voting criteria, a master node may distribute the weighted voting criteria throughout the blockchain network. For example, the weighted voting criteria may be stored in the blockchain ledger in each node. Likewise, a master node may transmit management messages throughout the blockchain network using an implemented blockchain protocol in order to update the blockchain ledger for each node accordingly. The weighted voting criteria may be used to determined weighted votes in a similar manner as described above in Block 220 of FIG. 2 and the accompanying description.

Figure 5:
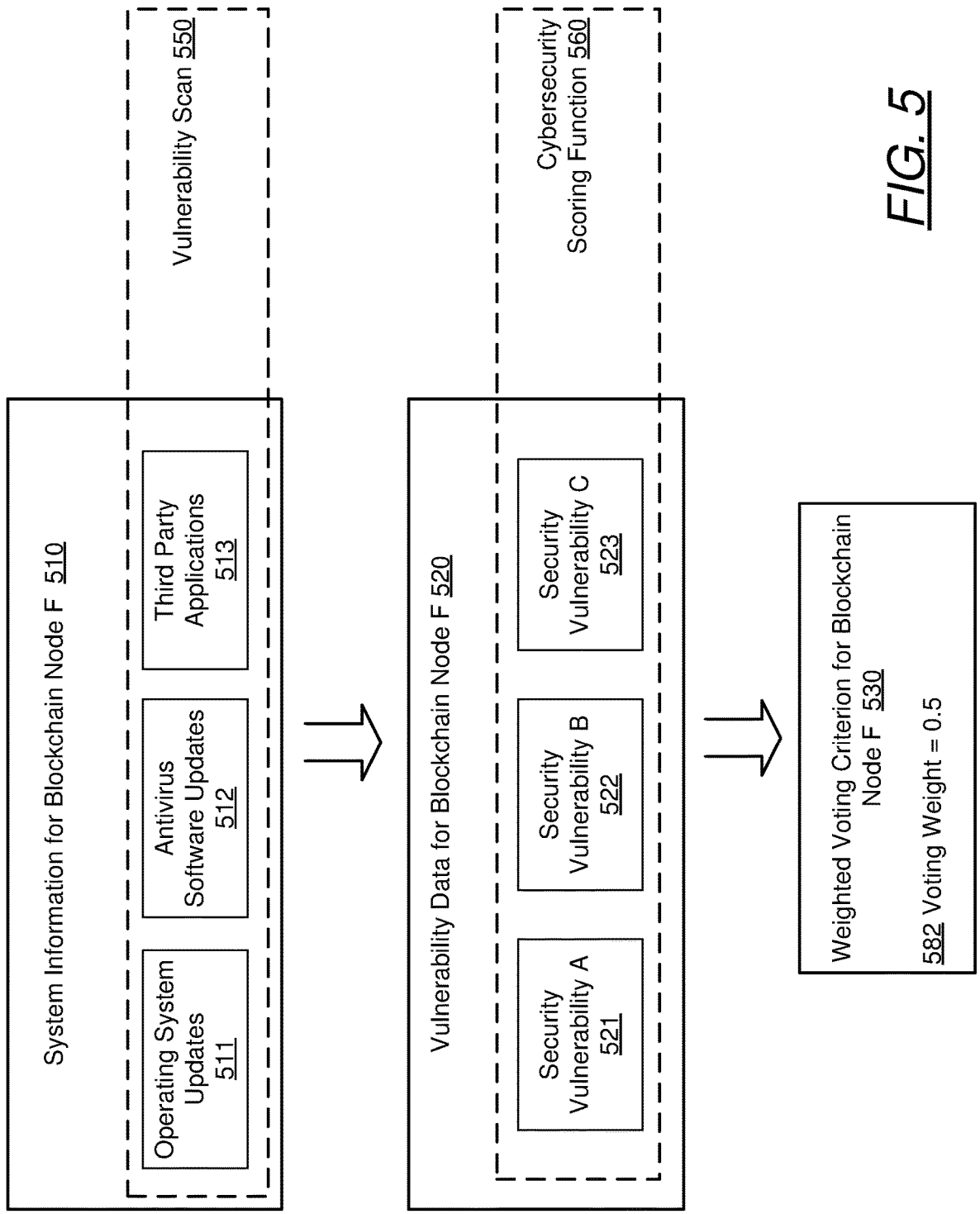
FIG. 5 shows an example in accordance with one or more embodiments.

Turning to FIG. 5, FIG. 5 provides an example of determining a weighted voting criterion. The following example is for explanatory purposes only and not intended to limit the scope of the disclosed technology. Turning to FIG. 5, FIG. 5 shows system information (510) for a blockchain node F. Specifically, the system information (510) includes a history of operating system updates (511), a history of antivirus software updates (512), and a list of third party applications (513) operating on blockchain node F. Accordingly, a vulnerability scan (550) is performed on the system information (510) in order to obtain vulnerability data (520) for blockchain F.

Keeping with FIG. 5, the vulnerability data (520) identifies security vulnerability A (521), security vulnerability B (522), and security vulnerability C (523) as being located on blockchain node F. Accordingly, a cybersecurity scoring function (560) is performed on the vulnerability data (520) to determine a weighted voting criterion (530) for blockchain F. Here, the weighted voting criterion (530) include a voting weight (582) of '0.5' for blockchain F. Thus, the voting weight (582) is added to blockchain F's ledger and other other ledgers in a corresponding blockchain network for use in blockchain transaction validations.

In some embodiments, blockchain nodes are Internet of Things (IoT) devices. For example, IoT devices may implement various security protocols using blockchain to provide protection against data tampering, and/or locking access to the IoT devices. In some embodiments, blockchain nodes include meters that automate and/or assist in performing maintenance, inspections, drilling operations, and/or safety activities.

In some embodiments, a blockchain node is a sensor device coupled to the drilling management network. In particular, a sensor device may include hardware and/or software that includes functionality to obtain one or more sensor measurements, e.g., a sensor measurement of an environment condition proximate the sensor device. The sensor device may process the sensor measurements into various types of sensor data, such as in a communication protocol format that may be transmitted over the drilling management network by a communication interface. Sensor devices may include pressure sensors, torque sensors, rotary switches, weight sensors, position sensors, microswitches, etc.

In some embodiments, blockchain notes implement smart contracts for reconciliation and tracking issues among contractors, sub-contractors, and suppliers. For example, a blockchain transaction may correspond to the negotiation or performance of a contract between parties. Thus, the blockchain network may use various computer protocols to digitally facilitate, verify, or enforce the negotiation or performance of such transactions. In particular, smart contracts may allow performance of credible transactions without third parties, where these transactions may be trackable and/or irreversible. In addition, blockchain networks may facilitate instant payments to automate and speed up various payment processes between parties.

In one or more embodiments, a blockchain network is part of a drilling management network that includes drilling equipment, such as draw works, top drive, mud pumps and other drilling components. The drilling management network may further include various drilling operation control systems and various maintenance control systems. Drilling operation control systems and/or maintenance control systems may include, for example, programmable logic controllers (PLCs) that include hardware and/or software with functionality to control one or more processes performed by a drilling rig.

Embodiments may be implemented on a computing system. Any combination of mobile, desktop, server, router, switch, embedded device, or other types of hardware may be used. For example, as shown in FIG. 6.1, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (600) in FIG. 6.1 may be connected to or be a part of a network. For example, as shown in FIG. 6.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Although not shown in FIG. 6.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6.1. Further, the client device (626) may include and/or perform all or a portion of one or more embodiments of the disclosure.

The computing system or group of computing systems described in FIGS. 6.1 and 6.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (600) in FIG. 6.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6.1, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 6.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6.1 and the nodes and/or client device in FIG. 6.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method, comprising:
   obtaining a first plurality of votes for a first blockchain transaction from a plurality of blockchain nodes;
   performing a vulnerability scan of a first blockchain node among the plurality of blockchain nodes to determine a cybersecurity state of the first blockchain node;
   increasing a voting weight of the first blockchain node in response to the cybersecurity state satisfying a predetermined threshold,
      wherein the voting weight of the first blockchain node is further increased in response to an additional vulnerability scan of the first blockchain node satisfying the predetermined threshold;
   determining a first plurality of weighted votes using the first plurality of votes and respective cybersecurity states of the plurality of blockchain nodes,
      wherein the respective cybersecurity states correspond to whether one or more predetermined security vulnerabilities are associated with the plurality of blockchain nodes, and
      wherein the respective cybersecurity states are dynamic values that are updated based on changes among the one or more predetermined security vulnerabilities; and
   determining whether to validate the first blockchain transaction based on the first plurality of weighted votes.

2. The method of claim 1,
wherein the vulnerability scan is performed by a vulnerability scanner over a network.

3. The method of claim 1,
wherein the one or more predetermined security vulnerabilities are selected from a group consisting of: an operating system lacking a current update, security vulnerabilities associated with a third party application, and an antivirus program lacking a virus definition update.

4. The method of claim 1, further comprising:
obtaining a second plurality of votes for a second blockchain transaction, wherein a majority of the second plurality of votes are against validating the second blockchain transaction; and
determining that the second blockchain transaction is valid based on a minority of the second plurality of votes being in favor of validating the second blockchain transaction,
wherein the minority of the second plurality of votes has greater voting weights than the majority of the second plurality of votes.

5. The method of claim 1,
wherein a cybersecurity state of a first blockchain node among the plurality of blockchain nodes is determined periodically, and
wherein a voting weight of the first blockchain node is updated when a new cybersecurity state is determined for the first blockchain node.

6. The method of claim 1,
wherein the plurality of blockchain nodes comprise a master node,
wherein the master node determines weighted voting criteria for voting among the plurality of blockchain nodes, and
wherein the master node transmits the weighted voting criteria to the plurality of blockchain nodes within a blockchain ledger.

7. The method of claim 1, wherein the plurality of blockchain nodes are Internet of Things (IoT) devices in a drilling management network.

8. The method of claim 1,
wherein each blockchain node among the plurality of blockchain nodes updates a respective ledger using the vulnerability data.

9. A node, comprising:
a computer processor; and
a memory coupled to the computer processor and executable by the computer processor, the memory comprising functionality for:
obtaining a first plurality of votes for a first blockchain transaction from a plurality of blockchain nodes;
performing a vulnerability scan of a first blockchain node among the plurality of blockchain nodes to determine a cybersecurity state of the first blockchain node;
increasing a voting weight of the first blockchain node in response to the cybersecurity state satisfying a predetermined threshold,
wherein the voting weight of the first blockchain node is further increased in response to an additional vulnerability scan of the first blockchain node satisfying the predetermined threshold;
determining a first plurality of weighted votes using the first plurality of votes and respective cybersecurity states of the plurality of blockchain nodes,
wherein the respective cybersecurity states correspond to whether one or more predetermined security vulnerabilities are associated with the plurality of blockchain nodes, and
wherein the respective cybersecurity states are dynamic values that are updated based on changes among the one or more predetermined security vulnerabilities; and
determining whether to validate the first blockchain transaction based on the first plurality of weighted votes.

10. The node of claim 9, wherein the memory further comprises functionality for:
obtaining a second plurality of votes for a second blockchain transaction, wherein a majority of the second plurality of votes are against validating the second blockchain transaction; and
determining that the second blockchain transaction is valid based on a minority of the second plurality of votes being in favor of validating the second blockchain transaction,
wherein the minority of the second plurality of votes has greater voting weights than the majority of the second plurality of votes.

11. The node of claim 9,
wherein a cybersecurity state of a first blockchain node among the plurality of blockchain nodes is determined periodically, and
wherein a voting weight of the first blockchain node is updated when a new cybersecurity state is determined for the first blockchain node.

12. The node of claim 9, wherein the one or more predetermined security vulnerabilities are selected from a group consisting of: an operating system lacking a current update, known security vulnerabilities associated with a third party application, and an antivirus program lacking a virus definition update.

13. A system, comprising:
a first blockchain node comprising a first hardware;
a second blockchain node comprising a second hardware;
a master node coupled over a network to the first blockchain node and the second blockchain node, wherein the master node comprises a third hardware and is configured to:
obtain vulnerability data regarding a first scan of the first blockchain node and a second scan of the second blockchain node, wherein the vulnerability data describes whether one or more predetermined security vulnerabilities are associated with the first blockchain node and the second blockchain node;
determine, using the vulnerability data, weighted voting criteria for validating blockchain transactions; and
transmit, to the first blockchain node and the second blockchain node, the weighted voting criteria; and
a vulnerability scanner coupled, over the network, to the first blockchain node, the second blockchain node, and the master node,
wherein the vulnerability scanner is configured to determine the one or more predetermined security vulnerabilities by performing the first scan of the first blockchain node and the second scan of the second blockchain node, and
wherein the vulnerability scanner is further configured to transmit the vulnerability data to the master node.

14. The system of claim 13,
wherein the weighting voting criteria is configured to determine a plurality of weighted votes for the first blockchain node, the second blockchain node, and the master node, respectively, and
wherein the plurality of weighted votes determine whether a blockchain transaction is validated by the first blockchain node, the second blockchain node, and the master node.

15. The system of claim 13,
wherein a cybersecurity state of the first blockchain node is determined periodically, and
wherein a voting weight of the first blockchain node is updated when a new cybersecurity state is determined for the first blockchain node.

16. The system of claim 13, wherein the first blockchain node performs a vulnerability scan on itself to generate a portion of the vulnerability data, and wherein the first blockchain node transmits the portion of the vulnerability data to the master node.

17. The system of claim 13, wherein the weighted voting criteria is stored within a blockchain ledger disposed in the first blockchain node, the second blockchain node, and the master node.

\* \* \* \* \*